US006471883B1

(12) United States Patent
Fell et al.

(10) Patent No.: US 6,471,883 B1
(45) Date of Patent: Oct. 29, 2002

(54) METHOD OF MANUFACTURING A VIBRATING STRUCTURE GYROSCOPE

(75) Inventors: Christopher P Fell, Plymouth (GB); Kevin Townsend, Plymouth (GB); Ian Sturland, Bristol (GB)

(73) Assignee: BAE Systems PLC, Farnborough (GB)

( * ) Notice: Subject to any disclaimer, the term of this patent is extended or adjusted under 35 U.S.C. 154(b) by 0 days.

(21) Appl. No.: 09/468,838

(22) Filed: Dec. 22, 1999

(30) Foreign Application Priority Data

Dec. 24, 1998 (GB) .............................................. 9828478

(51) Int. Cl.$^7$ .............................................. G01C 19/56
(52) U.S. Cl. .............................. 216/77; 216/41; 216/66; 216/67; 216/79; 438/712; 438/719; 438/720; 73/514.01
(58) Field of Search ................................ 216/2, 11, 41, 216/58, 66, 67, 74, 77, 83, 96, 102, 103, 79; 438/48, 689, 704, 706, 712–719, 723, 720, 745; 73/514.01, 514.35

(56) References Cited

U.S. PATENT DOCUMENTS

| | | | | | |
|---|---|---|---|---|---|
| 5,006,487 A | * | 4/1991 | Stokes | ........................ | 437/228 |
| 5,216,490 A | * | 6/1993 | Greiff et al. | .................. | 73/517 |
| 5,535,902 A | * | 7/1996 | Greiff | ............................ | 216/2 |
| 5,547,093 A | | 8/1996 | Sparks | | |
| 5,600,065 A | * | 2/1997 | Kar et al. | ................ | 73/504.12 |
| 5,725,729 A | * | 3/1998 | Greiff | ..................... | 156/657.1 |
| 5,783,749 A | * | 7/1998 | Lee et al. | ................ | 73/504.12 |
| 5,789,323 A | * | 8/1998 | Taylor | ............................ | 216/6 |
| 5,846,638 A | * | 12/1998 | Meissner | ..................... | 428/220 |
| 5,885,353 A | * | 3/1999 | Strodtbeck et al. | ......... | 118/712 |
| 5,924,010 A | * | 7/1999 | Chen et al. | .................. | 438/653 |
| 5,929,497 A | * | 7/1999 | Chavan et al. | .............. | 257/417 |
| 6,018,998 A | * | 2/2000 | Zunino et al. | ........... | 73/514.16 |
| 6,067,858 A | * | 5/2000 | Clark et al. | .............. | 73/504.16 |
| 6,143,583 A | * | 11/2000 | Hays | ............................ | 438/39 |
| 6,146,917 A | * | 11/2000 | Zhang et al. | .................. | 438/51 |
| 6,159,798 A | * | 12/2000 | Hwu | .......................... | 438/257 |

FOREIGN PATENT DOCUMENTS

| | | |
|---|---|---|
| DE | 19617666 | 11/1997 |
| EP | 0 619 471 | 10/1994 |
| EP | 0 623 807 | 11/1994 |
| WO | WO 97/45699 | 12/1997 |

* cited by examiner

Primary Examiner—Randy Gulakowski
Assistant Examiner—Jiri Smetana
(74) Attorney, Agent, or Firm—Nixon & Vanderhye P.C.

(57) ABSTRACT

A vibrating structure gyroscope having a silicon substantially planar ring vibrating structure (1) capacitive means for imparting drive motion to and sensing motion of the vibrating structure (1), and a screen layer (15) surrounding the capacitive means is made by depositing photoresist material (9) on a glass or silicon substrate (7), hardening, patterning and developing the photoresist (9) to expose areas of the substrate (7), etching the exposed areas to form cavities (10) therein, stripping any remaining photoresist material (9) attaching a silicon layer (8) to the cavitated substrate (7) depositing a layer of aluminium on the silicon layer (8), depositing photoresist material on the aluminium layer, hardening, patterning and developing the photoresist layer to expose areas of the aluminium layer, etching the exposed areas of the aluminium layer to leave regions of aluminium on the silicon layer providing bond pads (11, 12, 13 and 14), stripping the remaining photoresist from the aluminium layer, depositing another layer of photoresist material on the silicon layer (8) over the remaining deposited aluminium layer regions, hardening, patterning and developing the layer of photoresist material to expose areas of the silicon layer (8) and deep reactive ion etching the exposed areas of the silicon layer (8) to form therefrom the substantially planar ring vibrating structure (1) mounted by a hub (4) above the cavities (10).

7 Claims, 2 Drawing Sheets

METHOD OF MANUFACTURING A VIBRATING STRUCTURE GYROSCOPE

BACKGROUND OF THE INVENTION

1. Field of the Invention

This invention relates to a method of manufacturing a vibrating structure gyroscope having a silicon substantially planar ring vibrating structure and capacitive means for imparting drive motion to and sensing motion of the vibrating structure. Such a manufacturing method is particularly suitable for producing a vibrating structure gyroscope by micromachining.

2. Discussion of Prior Art

Micromachined vibrating structure gyroscopes are capable of being produced in high volumes and at low unit cost. This has opened up a diversity of new commercial application areas such as automobile chassis control and navigation systems and camcorder stabilization.

Micromachined vibrating structure gyroscopes are capable of being produced in high volumes and at low unit cost. This has opened up a diversity of new commercial application areas such as automotive chassis control and navigation systems and camcorder stabilisation.

Conventional vibrating structure gyros may be constructed using a variety of resonator designs. These include vibrating beams, tuning forks, cylinders, hemispherical shells and rings. Due to the inherently planar nature of micromachining processes, not all of these structures are suitable for micro-fabrication. The wafer processing techniques give high dimensional tolerancing and alignment accuracies in the plane of the wafer. For ring structures all of the resonance motion is in the plane of the ring and hence it is these dimensions which are most critical to device performance. Planar ring structures are thus particularly suitable for production using these methods and a number of designs are known. These include the inductively driven and sensed devices described in EP-B-0619471, EP-A-0859219. EP-A-0461761 and U.S. Pat. No. 5,547,093 additionally describe devices which are driven and sensed capacitively.

In the previously proposed inductive devices the resonator structures are etched from crystalline Silicon wafers. However, they require the application of a magnetic field to provide the transducer functions. This is facilitated by the use of a magnetic circuit incorporating a permanent magnet and shaped pole pieces. These must be constructed using conventional fabrication techniques and require subsequent assembly and accurate alignment to the resonator structure. This limits the degree of device miniaturization that is possible and adds significantly to the unit cost.

The device described in EP-B-0619471 is also etched from a crystalline Silicon wafer but has the advantage that the drive and pick-off transducer structures are fabricated using wafer processing and assembly techniques and do not require additional, non-micromachined components to operate. The design and fabrication method is thus compatible with a device size significantly smaller than the inductive devices. The design employs a stack of three bonded wafers which must be individually processed and accurately aligned. The transducer gains, and hence the device performance, will be dependent upon the depth of the cavity formed between the wafers. While the micro-fabrication processes provide accurate alignment and tolerancing in the plane of the wafer, control of dimensions in this third axis is less accurate resulting in an inevitable variability in device characteristics. A further disadvantage of this device is the large number of fabrication steps and the requirement for double sided wafer processing. Therefore, while this design does result in a potentially small device which eliminates the requirement for the fabrication and assembly of magnetic circuit components, the complex fabrication will still result in a high unit cost.

The device described in U.S. Pat. No. 5,547,093 also has drive and pick-off transducer structures produced using wafer processing techniques and is capable of fabrication in small size. This design has the additional advantage that the critical transducer gaps are in the plane of the wafer and thus accurately controlled. However, unlike the previous devices the resonator in this instance is constructed from electroformed metal. For the devices etched from crystalline Silicon, the mechanical properties of the material from which the resonator is formed are unaffected by the fabrication processes. The performance of any vibrating structure gyro is critically dependent upon the nature and stability of the mechanical properties of the resonator. Crystalline Silicon is capable of sustaining high Q oscillations with resonance characteristics which are stable over temperature and is thus an ideal resonator material. Electroformed metals are not capable of matching the near perfect elastic behaviour and uniformity of crystalline Silicon. In order to optimize the deposition process uniformity it is necessary to maintain a constant feature size. This requires the ring and support leg widths of the vibrating structure to be identical and severely restricts the resonator dimensional design flexibility. The modal behaviour of the resulting structure will be dominated by the resonator support legs giving potential mounting sensitivity problems and complicating mode balancing procedures. Fabrication of this structure is a complex procedure involving a large number of process steps which will adversely affect both device wafer yield and fabrication costs.

GB Patent Application No. 9817347.9 describes a capacitively driven and sensed ring vibrating structure or resonator which may be fabricated from bulk crystalline Silicon. This structure is shown in plan view in FIG. 1.

There is a need for a method of manufacturing such a gyroscope to an improved degree of accuracy whilst ensuring that the resulting vibrating structure preserves the mechanical properties of the Silicon.

SUMMARY OF THE INVENTION

According to one aspect of the present invention there is provided a method of manufacturing a vibrating structure gyroscope having a silicon substantially planar ring vibrating structure, capacitive means for imparting drive motion to and sensing motion of the vibrating structure, and a screen layer surrounding the capacitive means, including the steps of depositing a first layer of photoresist material on to one surface of a plate like glass or silicon substrate, hardening, patterning and developing the first photoresist layer to expose selected areas of the substrate, etching said exposed areas of the substrate to form cavities therein, stripping the remaining first layer photoresist material from the cavitated substrate, attaching a layer of silicon to the cavitated said one surface of the substrate, depositing a layer of aluminium on the surface of the silicon layer most remote from the surface thereof attached to the substrate, depositing a second layer of photoresist material on to the outermost surface of the aluminium layer with respect to the silicon layer, hardening, patterning and developing the second photoresist layer to expose selected areas of the aluminium layer,etching said exposed areas of the aluminium layer to leave on the silicon layer regions of aluminium providing bond pads for grounding the screen layer, bond pads forming connection points for the capacitive drive and sensing means, and bond pads for electrical connection to the silicon substantially planar ring vibrating structure, stripping the remaining second photoresist layer from the aluminium layer, depositing a third layer of photoresist material on to the silicon layer over the remaining deposited aluminium layer regions, hardening, patterning and developing the third layer of photoresist material to expose selected areas of the silicon layer, deep reactive ion etching the exposed selected areas of the silicon layer to form, from the silicon layer, the capacitive drive and sensing means, the surrounding layer, and the substantially planar ring vibrating structure mounted by a hub above the substrate cavities which permit unrestricted oscillation of the ring structure, and electrically to isolate the capacitive drive and sensing means, screen layer and ring vibrating structure from one another.

Preferably the photoresist material is deposited by spinning and hardened by baking.

Conveniently selected areas of the substrate exposed by developing the first photoresist layer are etched by an isotropic wet etch process.

Advantageously the substrate is made of glass to which the silicon layer is attached by anodic bonding.

Alternatively the substrate is made of silicon thermally oxidized to produce a surface oxide layer to which the silicon layer is attached by fusion bonding.

Conveniently the layer of aluminium is attached to the silicon layer by sputtering.

Advantageously the exposed areas of the aluminium layer are etched by a phosphoric acid based process.

BRIEF DESCRIPTION OF THE DRAWINGS

For a better understanding of the present invention and to show how the same may be carried into effect, reference will now be made, by way of example, to the accompanying drawings in which.

DETAILED DISCUSSION OF EMBODIMENTS

Figure 1:
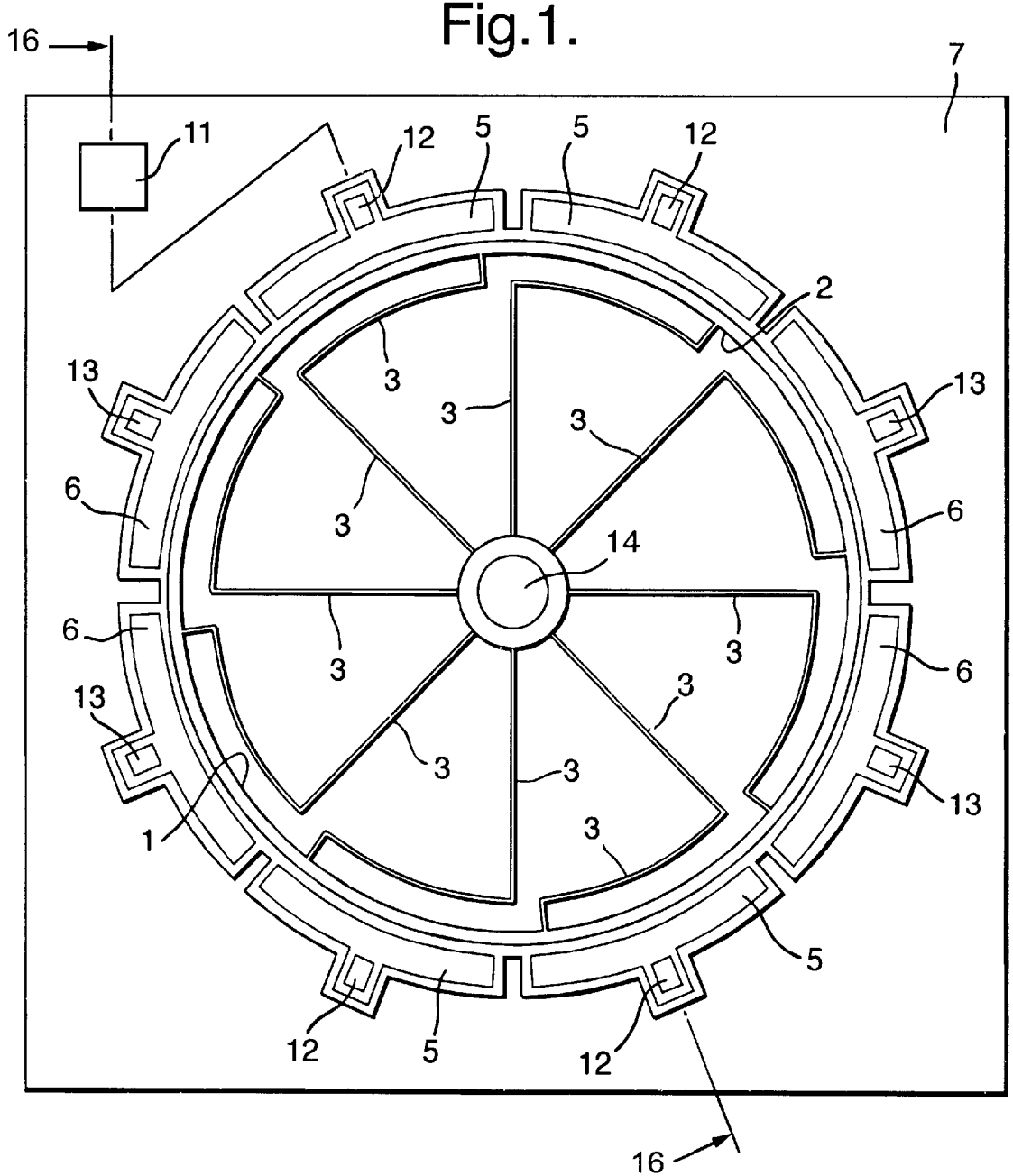
FIG. 1 is a diagrammatic view from above of a capacitively driven and sensed ring vibrating structure or resonator gyroscope not according to the invention as described and claimed in GB patent application no. 9817347.9.

The method according to the present invention of manufacturing a vibrating structure gyroscope is suitable for the manufacture of a gyroscope as shown in FIG. 1 having a silicon substantially planar ring vibrating structure 1 made up of a silicon substantially planar ring resonator 2 supported via silicon support legs 3 which extend inwardly from the ring resonator 2 to a central silicon hub 4. The gyroscope of FIG. 1 has capacitive drive means 5 for imparting drive motion to the ring resonator 2 and capacitive sensing means 6 for sensing and picking off motion of the ring resonator 2. The gyroscope device includes a substrate 7 made from glass whose thermal expansion coefficient is matched to that of a silicon layer 8, see FIGS. 2 to 5, in order to minimise thermally induced stresses. Alternatively the substrate 7 may be made of silicon such that the thermal expansion coefficient is precisely matched to that of the silicon layer 8.

Figure 2:
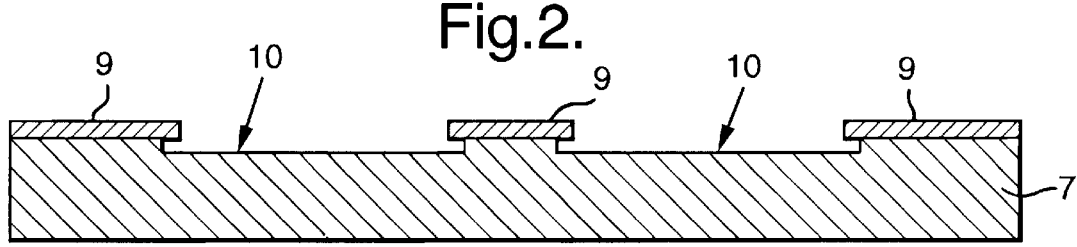
FIG. 2 is a cross sectional view corresponding to line 16—16 of FIG. 1 showing a first stage in a method according to the present invention of manufacturing a gyroscope according to FIG. 1.

The method of the present invention for manufacturing a vibrating structure gyroscope of the kind shown in FIG. 1 includes the steps of depositing a first layer 9 of photoresist material onto one surface of the plate like glass or silicon substrate 7 as shown in FIG. 2 of the accompanying drawings. The photoresist material utilized preferably is an industry standard "positive photoresist" such as Shipley S1818SP16. Preferably the photoresist first layer 9 is deposited on the substrate 7 by spinning. The first photoresist layer 9 is then hardened such as by baking, patterned using an exposure mask and developed to expose selected areas of the substrate 7 for subsequent etching. The exposed areas of the substrate 7 are then etched, such as by using an isotropic wet etched process, to form cavities 10, as shown in FIG. 2, in the substrate 7. The cavities 10 are shaped to provide for unrestricted oscillation of the support legs 3 and ring resonator 2 portions of the gyroscope to be subsequently formed. A cavity depth of 20 to 30 $\mu$m is typically employed and alignment keys, not shown, may also be etched in the substrate 7 to allow for accurate alignment of subsequent mask levels to the cavities 10. The remaining first layer 9 is then stripped from the cavitated substrate 7.

Figure 3:
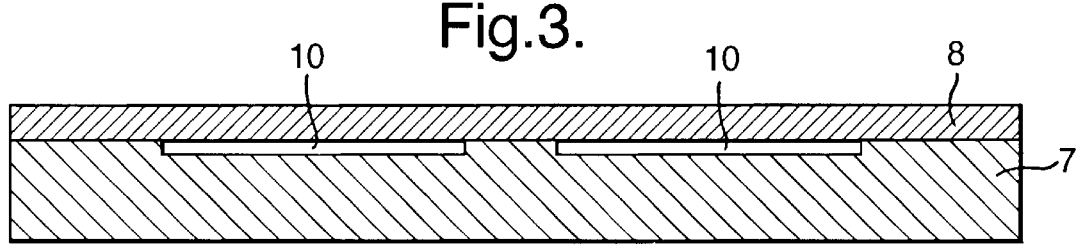
FIG. 3 is a view similar to that of FIG. 2 showing another stage in the method of the present invention.

When the substrate 7 is made from glass silicon device layer wafer 8 is attached thereto by anodically bonding onto the cavitated surface of the substrate 7. This is shown in FIG. 3. The layer 8 may be thinned to the desired thickness prior to bonding or may be thinned after bonding. The anodic bonding process involves placing the substrate 7 and layer 8 in intimate contact, heating to approximately 400° C. and applying a potential of approximately 1,000 volts between the glass substrate 7 and the silicon layer 8.

Alternatively when the substrate 7 is made of silicon, this is thermally oxidized to produce approximately 1 $\mu$m surface oxide layer and the oxidized surface of the layer 8 is then fusion bonded to the cavitated surface of the silicon substrate 7. This latter process involves intimately contacting the surfaces of the layer 8 and substrate 7 and heating up to approximately 600° C. This process requires the surfaces of the layer 8 and the substrate 7 to be extremely flat and free from surface contamination.

The metalization and etching steps require the masks for these steps to be accurately aligned to the cavities 10. When using a glass substrate 7 the alignment keys will be visible through the underside of the bonded layer and substrate pair. The metalization and etch marks may accurately be aligned to these keys using a double-sided aligner. When using a Silicon substrate 7 it is not possible to view features on the bonded surface. In this instance it is necessary to produce alignment keys on the bottom surface of the substrate 7. This requires the use of an additional mask level with these keys being aligned, using a double-sided aligner, to the cavitated surface keys.

It is possible to avoid the use of double-sided alignment if the alignment keys on the substrate 7 are exposed through the layer 8. This requires the Silicon layer 8 to be etched in the region around the alignment key locations. An additional etch mask is required with the Silicon being conveniently removed using an isotropic dry etch process. The exposed area should be sufficiently large to ensure that the alignment keys are fully exposed without the need for accurate alignment to the substrate wafer (e.g. 4 mm×4 mm hole). Having exposed the alignment keys on the bonded substrate surface, single-sided alignment may be employed for subsequent mask levels.

Figure 4:
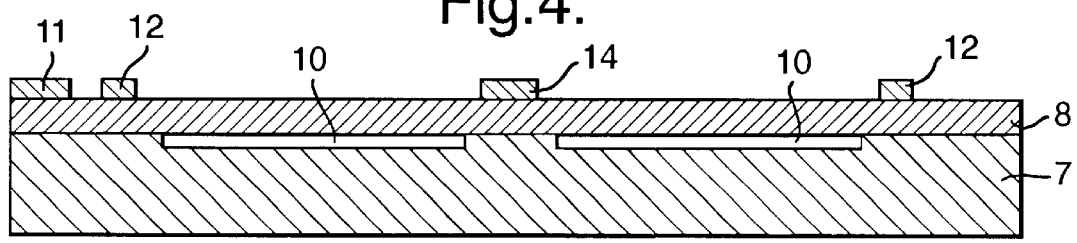
FIG. 4 is a view similar to that of FIGS. 2 and 3 showing a further stage in the method of the present invention.

The next step in the method of the present invention involves the deposition of a layer of aluminium (not shown) on the surface of the silicon layer 8 most remote from the surface thereof attached to the substrate 7. Preferably the aluminium is deposited by sputtering. A second layer of photoresist material (not shown) is then deposited on the outermost surface of the aluminium layer with respect to the silicon layer 8 preferably by spinning, hardened, preferably by baking, patterned and developed to expose selected areas of the aluminium layer. The exposed areas of the aluminium layer are then etched preferably by using a phosphoric acid based process, to leave on the silicon layer 8 regions of aluminium providing bond pads as shown in FIG. 4 of the accompanying drawings.

In this way a bond pad 11 is provided for contacting a screen layer to ground potential with additional bond pads 12 and 13 for connection of drive and pick-off (sensing) sites respectively to external circuitry (not shown). A further bond pad 14 is provided for electrical connection of the ring resonator 2.

Figure 5:
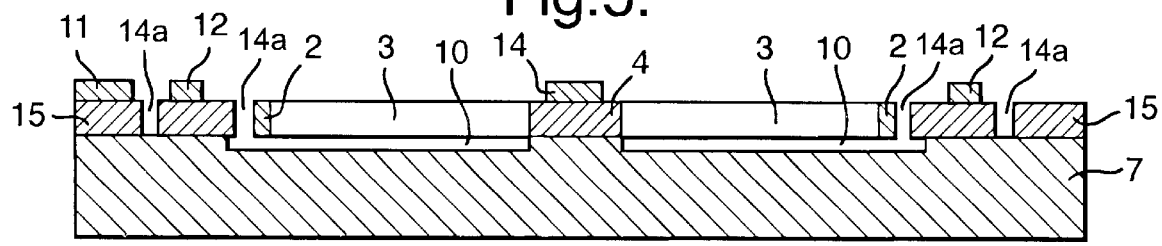
FIG. 5 is a cross sectional view on the line 16—16 of FIG. 1 showing another stage in the method of the present invention.

The remaining second photoresist layer is then stripped from the aluminium layer that is from the bond pads 11, 12, 13 and 14 and a third layer of photoresist material is deposited, preferably by spinning onto the exposed surface of the silicon layer 8 over the deposited aluminium bond pads 11, 12, 13 and 14. The third layer of photoresist material is then hardened, preferably by baking, patterned and developed to expose selected areas of the silicon layer 8. An etch mask is aligned to the cavity alignment keys on the substrate 7 before the third layer of photoresist material is exposed and developed. Deep reactive ion etching is performed on the exposed selected areas of the silicon layer 8 to form therefrom the substantially planar ring vibrating structure, namely the support legs 3 and ring resonator 2 mounted on hub 4 above the substrate cavities 10, the capacitive drive and sensing means 5, 6 and a screen layer 15 surrounding the resonator 2 and drive and sensing means 5, 6, as shown in FIGS. 1 and 5 of the accompanying drawings. Mounting these structures on the surface of the insulating substrate 7 electrically isolates the individual structures with respect to one another. The etching is carried out using a proprietary deep reactive ion etch (DRIE) process which is capable of producing deep narrow trenches 14, with aspect ratios of up to approximately 40:1, in silicon with near vertical side walls. The etching process involves the separating out of a spontaneous chemical etching of silicon by fluorine based plasma and the passivation of the side wall of the feature being etched by a fluoropolymer passivation step. By alternating the steps under computer control vertical walled features can be produced in silicon with high accuracy and quality.

The etch rate for silicon is considerably higher than for glass and thus the glass substrate 7 will act as an etch stop. This will leave the drive pads 12 and pick-off pads 13 bonded to the substrate 7 via the silicon layer 8 and electrically isolated from the surrounding screen layer 15. The remaining third layer photoresist material is then stripped from the aluminium layer.

In operation, the gyroscope motion is excited and controlled by means of oscillating voltages applied, at the resonant frequency, to the capacitive drive sites 5. The resultant ring motion is detected via the current flow across the pick-off capacitor gaps. Gyro performance errors arise if drive signals couple capacitively to the pick-offs giving rise to spurious signals. This coupling may be minimized by means of the screen layer 15 which surrounds each capacitive site on all sides in the plane of the layer 8 except that facing the ring resonator 2. The screen layer 15 is externally connected to ground potential via the wire bond pad 11 on the upper surface.

Where the substrate 7 is Silicon an additional capacitive coupling route exists due to the finite conductivity of the material of the layer 8. The drive signal may couple into the substrate 7 which is only separated from the bottom surface of the drive capacitors by the thin (~1 μm) oxide layer between the layer 8 and layer 7. This may in turn couple back into the pick-off capacitor sites. This coupling mechanism can be eliminated by electrically connecting the substrate 7 to ground. If the assembly 2 is mounted in a metal can (not shown) then this may conveniently be achieved by directly contacting the substrate bottom surface to the surface of the can, for example, by using conductive epoxy. The can may then be connected to ground via the external circuitry. When this is not convenient, connection to the upper surface by means of a wire bond may be facilitated with some modification to the processing. This requires additional access holes to be etched in the screen layer 15 at the corners of the substrate 7 which may be achieved by modification to the etch mask. The exposed oxide at the bottom of these holes is removed by means of an oxide selective dry etch process thus exposing the conductive substrate surface. In order to facilitate electrical connection to the substrate 7 an additional metalization process step is required. Metal such as aluminum may then be deposited onto the surface of the holes using a simple shadow mask technique. The ground connection may then be made by means of a wire bond between the metalized hole surface and the screen layer bond pads 11.

A plurality of gyroscope devices may be made on a single glass or silicon substrate and separated after processing by dicing. Alternatively trenches may be sawn into the substrate 7 to a depth sufficient to allow subsequent cleaving along the saw lines to separate the individual devices. This is conveniently done immediately after bonding of the layer 8 and substrate 7. This has the advantage that the debris created during the sawing process appears before the etching of the narrow trenches 14a. The cleaving process will not produce debris and thus reduces the risk of obstructing the trenches 14a and hence preventing the free oscillation of the ring resonator 2.

The fabrication method of the invention results in a structure which preserves the mechanical properties of the silicon layer 8. The critical dimensional tolerances of the resonator and drive and pick-off transducer gaps 14a are all defined in the plane of the layer 8. These structures may be fabricated to a high degree of accuracy using standard masking and deep reactive ion etching techniques. These techniques are fully compatible with the manufacture of small gyroscope device sizes but may also be applied to the fabrication of devices of a wide range of dimensions without significant modification. The method additionally provides for single sided processing with a minimum number of process steps giving a high yield, low cost, fabrication route.

We claim:

1. A method of manufacturing a vibrating structure gyroscope having a silicon substantially planar ring vibrating structure, capacitive means for imparting drive motion to and sensing motion of the vibrating structure, and a screen layer surrounding the capacitive means, said method including the steps of:

depositing a first layer of photoresist material on to one surface of a plate like glass or silicon substrate, hardening, patterning and developing the first photoresist layer to expose selected areas of the substrate, etching said exposed areas of the substrate to form cavities therein, stripping the remaining first layer photoresist material from the cavitated substrate attaching a layer of silicon to the cavitated said one surface of the substrate, depositing a layer of aluminum on the surface of the silicon layer opposite the surface attached to the substrate, depositing a second layer of photoresist material on to the outermost surface of the aluminum layer with respect to the silicon layer, hardening, patterning and developing the second photoresist layer to expose selected areas of the aluminum layer, etching said exposed areas of the aluminum layer to leave on the silicon layer regions of aluminum providing bond pads for grounding the screen layer, bond pads forming connection points for the capacitive drive and sensing means, and bond pads for electrical connection to the silicon substantially planar ring vibrating structure, stripping the remaining second photoresist layer from the aluminum layer, depositing a third layer of photoresist material on to the silicon layer over the remaining deposited aluminum layer regions, hardening, patterning and developing the third layer of photoresist material to expose selected areas of the silicon layer, deep reactive ion etching the exposed selected areas of the silicon layer to form, from the silicon layer, the capacitive drive and sensing means, the surrounding screen layer and the substantially planar ring vibrating structure mounted by a hub above the substrate cavities providing unrestricted oscillation of the ring structure, and electrically isolating each of the capacitive drive and sensing means, screen layer and ring vibrating structure from one another.

2. A method according to claim 1, in which the photoresist material is deposited by spinning and hardened by baking.

3. A method according to claim 1, in which selected areas of the substrate exposed by developing the first photoresist layer are etched by an isotropic wet etch process.

4. A method according to claim 1, in which the substrate is made of glass to which the silicon layer is attached by anodic bonding.

5. A method according to claim 1, in which the substrate is thermally oxidized silicon to produce a surface oxide layer to which the silicon is attached by fusion bonding.

6. A method according to claim 1, in which the layer of aluminum is attached to the silicon layer by sputtering.

7. A method according to claim 1, in which the exposed areas of the aluminum layer are etched by phosphoric acid.

\* \* \* \* \*